(12) United States Patent
Dell et al.

(10) Patent No.: US 7,158,528 B2
(45) Date of Patent: Jan. 2, 2007

(54) SCHEDULER FOR A PACKET ROUTING AND SWITCHING SYSTEM

(75) Inventors: Martin S. Dell, Bethlehem, PA (US); John Leshchuk, Tinton Falls, NJ (US); Wei Li, Basking Ridge, NJ (US); Walter A. Roper, Morganville, NJ (US); Matthew Tota, Clinton, NJ (US)

(73) Assignee: Agere Systems Inc., Allentown, PA (US)

( * ) Notice: Subject to any disclaimer, the term of this patent is extended or adjusted under 35 U.S.C. 154(b) by 900 days.

(21) Appl. No.: 10/017,503

(22) Filed: Dec. 14, 2001

(65) Prior Publication Data

US 2002/0136230 A1    Sep. 26, 2002

Related U.S. Application Data

(60) Provisional application No. 60/255,749, filed on Dec. 15, 2000.

(51) Int. Cl.
*H04L 12/28* (2006.01)

(52) U.S. Cl. ..................... 370/416; 370/235

(58) Field of Classification Search ........... 370/230, 370/230.1, 235, 412, 413, 414, 415, 416, 370/417, 418

See application file for complete search history.

(56) References Cited

U.S. PATENT DOCUMENTS

| | | | |
|---|---|---|---|
| 5,124,978 A | 6/1992 | Chao | 370/422 |
| 5,157,654 A | 10/1992 | Cisneros | 370/60 |
| 5,255,265 A | 10/1993 | Eng et al. | 370/60 |
| 5,361,255 A | 11/1994 | Diaz et al. | 370/374 |
| 5,440,553 A | 8/1995 | Widjaja et al. | 370/411 |
| 5,497,369 A | 3/1996 | Wainwright | 370/60 |
| 5,500,858 A | 3/1996 | McKeown | 370/60 |
| 5,537,403 A | 7/1996 | Cloonan et al. | 370/352 |
| 5,550,815 A | 8/1996 | Cloonan et al. | 370/396 |
| 5,555,243 A | 9/1996 | Kakuma et al. | 370/352 |
| 5,612,953 A | 3/1997 | Olnowich | 370/367 |
| 5,631,902 A | 5/1997 | Yoshifuji | 370/388 |
| 5,689,500 A | 11/1997 | Chiussi et al. | 370/235 |
| 5,689,505 A | 11/1997 | Chiussi et al. | 370/388 |
| 5,754,120 A | 5/1998 | Argentati | 340/876 |
| 5,852,601 A | 12/1998 | Newman et al. | 370/230 |
| 5,938,749 A * | 8/1999 | Rusu et al. | 710/54 |
| 6,125,112 A | 9/2000 | Koning et al. | 370/388 |
| 6,160,812 A | 12/2000 | Bauman et al. | 370/416 |
| 6,243,382 B1 | 6/2001 | O'Neill et al. | 370/395 |
| 6,324,165 B1 * | 11/2001 | Fan et al. | 370/232 |
| 6,430,181 B1 | 8/2002 | Tuckey | 370/386 |
| 6,438,134 B1 * | 8/2002 | Chow et al. | 370/412 |
| 6,519,225 B1 | 2/2003 | Angle et al. | 370/229 |

(Continued)

*Primary Examiner*—Huy D. Vu
*Assistant Examiner*—Christine Ng

(57) ABSTRACT

In one embodiment, queues associated with a first traffic class (FTC) are selected for service. Each FTC queue having at least one enqueued cell is identified as an occupied FTC queue, Where at least one FTC queue is provisioned for burst scheduling of multiple cells when serviced. An occupied FTC queue provisioned for burst scheduling is identified as a super-occupied FTC queue when the number of cells enqueued is greater than a specified number. Each occupied FTC queue is set as eligible for service based on a FTC scheduling algorithm. An eligible FTC queue is selected for service based on a corresponding sub-priority of each eligible FTC queue. Each FTC queue is assigned a sub-priority based on a service level of a connection associated with enqueued cells. When the super-occupied queue is serviced, the number of cells dequeued is based on a burst size.

40 Claims, 7 Drawing Sheets

U.S. PATENT DOCUMENTS

| | | | |
|---|---|---|---|
| 6,560,230 B1 * | 5/2003 | Li et al. | 370/395.42 |
| 6,570,873 B1 | 5/2003 | Isoyama et al. | 370/375 |
| 6,762,995 B1 * | 7/2004 | Drummond-Murray et al. | 370/229 |
| 6,778,536 B1 | 8/2004 | Ofek et al. | 370/395.4 |
| 6,829,237 B1 | 12/2004 | Carson et al. | 370/386 |
| 6,865,154 B1 * | 3/2005 | Charny et al. | 370/235 |
| 6,868,084 B1 | 3/2005 | Konda | 370/395.1 |
| 6,870,831 B1 | 3/2005 | Hughes et al. | 370/352 |
| 6,907,041 B1 | 6/2005 | Turner et al. | 370/412 |

* cited by examiner

SCHEDULER FOR A PACKET ROUTING AND SWITCHING SYSTEM

CROSS-REFERENCE TO RELATED APPLICATIONS

This application claims the benefit of the filing date of U.S. provisional application No. 60/255,749, filed on Jan. 15, 2000. This application is one of a set of U.S. patent applications consisting of Ser. No. 10/017,173 Ser. No. 10/017,174 and Ser. No. 10/017,503 all of which were filed on the same date and the teachings of all of which are incorporated herein by reference.

BACKGROUND OF THE INVENTION

1. Field of the Invention

The present invention relates to routing packets in a communication network, and, more particularly, to scheduling routing of packets through a node of the network to guarantee levels of service between data sources and destinations.

2. Description of the Related Art

Telecommunication systems typically employ a physical hierarchical structure to integrate multiple user data channels for transmission through a medium. Transmission through the medium at one level of the hierarchy is generally at a much higher rate than the rate of each user's data at a lower level of the hierarchy. For synchronous networks, the methods employed for multiplexing may use a frame format in which data of individual user channels are inserted into predefined "slots" within a frame. Some networks have rather rigid provisioning for channel-slot allocation, while others, such as synchronous packet (cell) networks, may allocate channels within the various timeslots with greater flexibility. In addition, telecommunication systems typically employ a logical hierarchical structure. For example, packet networks may have a hierarchical structure in which smaller networks are interconnected by larger networks, and a peer structure in which equivalent networks are interconnected. However, transport of packets at one level of the hierarchy may be accomplished by dividing up packets of other levels. For example, a packet for transport through a network may be divided into smaller pieces. Each piece may then be assigned to one or more cells, each of which is itself a packet.

A user's communication path through a network comprises those nodes and links through which the user data stream traverses. Nodes may contain (packet) switching and routing equipment, multiplexing/demultiplexing, and/or other terminal equipment; and links may be those physical lines (e.g., electrical or optical) as media that connect the equipment. Interior routing protocols are employed by network nodes to determine and establish a path through the nodes of the network along which packets between a source (ingress) node and destination (egress) node pair are forwarded. Packets received by a node's router are forwarded to other nodes based on forwarding information constructed in accordance with the interior routing protocol, but may also be through routes installed with explicit route (terminal input/output port pair) provisioning. Forwarding combines the physical and logical hierarchies by specifying how packets with certain source/destination addresses received at input ports of the nodes terminal equipment are passed to particular output ports for forwarding to the intended destination. Once provisioned along a physical path through the network, a logical channel exists through which packet connections may be established at any given time. At any given node of a network through which the user communication path traverses, several processing functions may be applied to a link carrying the user's logical channel. These processing functions may be employed for switching and cross-connect (e.g., cell-relay) operations, or may be employed for re-formatting operations (e.g., convert between packet formats of different packet networks).

Routing protocols, in addition to providing connectivity, may also provide connectivity given certain provisioned service guarantees. The Multi-Protocol Label Switched (MPLS) standard, for example, allows such routing protocols in networks. The MPLS standard may be employed for networks having virtual circuits (packet flows) or label switched paths (LSPs) with provisioned service levels (also known as guaranteed quality-of-service (QoS)). Provisioned service levels may be, for example, a guaranteed minimum bandwidth for the path of a packet flow through the network, a minimum delay experienced by packets flowing through the network, or bounds on the number of lost or corrupted packets. In general, these service levels may be defined in terms of effective bandwidth.

Packet networks, such as asynchronous transfer mode (ATM) networks, commonly schedule processing and forwarding of data packets/cells received at each intermediate node. Such scheduling may be employed to reduce or prevent excessive delay experienced by packets of each user's data connection, termed a virtual circuit connection (VC-connection), as the packets are routed through the node. A relatively simple prior art method of scheduling is termed "round-robin" or "token ring" scheduling. For round-robin scheduling, cells of each logical channel are buffered in a corresponding queue, and the scheduler determines when, in relation to a system clock, the queue is eligible for service (the transfer of one or more cells from the queue to an output port). Round-robin scheduling services, in sequence, each queue (and hence, the sequence of logical channels) by examining the queue to see if it is empty, processes a non-empty queue until a specified event is detected, and then examines the next queue in the sequence. The sequence is considered "token ring" scheduling since queues are examined and, if necessary, serviced in ascending or descending order, and returns to the first queue in the sequence after the last queue in the sequence is served. As each one of the non-empty queues is served, data in the serviced queue is transferred into the slot(s) of the output frame until either of two types of events first occurs. The first type of event occurs when the currently serviced queue becomes empty. The second type of event is that a timer generates an interrupt causing the scheduler to advance to the next queue in the sequence. Timer-generated interrupts may be used to introduce "fairness" to service of queues.

Scheduling incorporating more complex methods of identifying eligible queues for service allows network providers to guarantee data transfer rates and bounds for delay through the node and the network. Network providers may then offer these rates and bounds for the VC-connections as a guaranteed service (e.g., QoS). Such algorithms for scheduling packets may achieve excellent delay and fairness properties by approximating an ideal scheduling discipline, known as a Generalized Processor Sharing (GPS) scheduling algorithm. One exemplary GPS scheduling algorithm is described in A. K. Parekh and R. G. Gallagher, "A Generalized Processor Sharing Approach to Flow Control in Integrated Services Networks: The Single-Node Case," *IEEE/ACM Trans. Networking*, pp. 344–357, June 1993.

Among GPS scheduling algorithms used by a scheduler of the node, the class of packet-by-packet rate-proportional servers (P-RPS) is known in the art for near optimal delay properties. The schedulers of this class compute, for each packet/cell, or group of packets/cells, queued in the node, a "timestamp" value (the timestamp is also known as the "virtual finishing time"). The timestamp specifies when the packet(s) should be routed (transmitted) relative to packet(s) of the other VC-connections in the node. Several such P-RPS scheduling algorithms well-known in the art are: Packet-by-packet Generalized Processor Sharing (P-GPS), Virtual Clock, Frame-based Fair Queuing (FFQ), Self-Clocked Fair Queuing (SCFQ), and Starting-Potential Fair Queuing (SPFQ). These algorithms differ in the specific measure or function used as the system potential (predefined service time reference that may be calculated on an on-going basis) to compute the timestamps.

In addition to delay properties, another measure of scheduling algorithm performance is the "fairness" of the scheduling discipline. Fairness is generally used to characterize the priority or distribution of delay that the scheduler assigns to servicing packet(s) of each connection in the queues when the node is backlogged (i.e., when the queues are not empty while servicing or completing service of a connection). Two measures of fairness are commonly employed in the art. The first fairness measure is the service fairness index that measures the distance (as mathematically defined, such as the Euclidean distance) of the particular scheduling discipline from the ideal fairness of GPS in distributing service to VC-connections that are simultaneously backlogged. The second fairness measure is the worst-case fairness index (WFI) that measures the maximum amount of time that packets of a backlogged VC-connection may have to wait between two consecutive services (e.g., processing and routing of two separately received groups of packets).

However, demand for bandwidth, higher speed link capabilities, and requirements of QoS provisioning force terminal equipment that provides packet switching through a node to operate at increasingly higher rates. A current goal of switch designers is to expand switch capacity (switching fabric) to operate at 10, or even 100, Tbps (terabits per second) while allowing scaling of the switch fabric from 10's to 1000's of ports. A challenge of such design is to maintain the QoS requirements for network protocols, such as provided in IP, ATM, and MPLS networks, when servicing traffic at Tbps rates. Scheduler design, both in its structure and algorithms employed to allocate service, directly effects whether the switch can maintain these QoS requirements.

SUMMARY OF THE INVENTION

In accordance with embodiments of the present invention, a scheduler allocates service to enqueued cells of connections provisioned for guaranteed service levels employing a structure with one or more of the following features to achieve efficient high-speed packet switching (cell relay). Some embodiments employ burst scheduling of cells in which a number of cells, termed a burst, are serviced when a queue is eligible for service. When a queue has less than the number of cells in the burst (termed a short burst), the scheduler still schedules service, but accounts for saved service time (or bandwidth) of the short burst via queue length when the queue's eligibility is next considered for service. Some embodiments logically allocate high and low bandwidth connections of a queue into at least two sub-queues, assign priority to the two queues, and assign delay-sensitive traffic (high bandwidth connections) to the higher priority sub-queue. In addition, high-bandwidth queues may be assigned high and super-high priority to account for ties in scheduling decisions for eligible queues. Some embodiments schedule a queue as eligible for service, but employ information generated from output ports indicating an output port's congestion to decide whether a bid for service of the eligible queue should be generated. Some embodiments employ a scheduler that allocates service to at least two different traffic types separately, e.g., standard traffic queues and guaranteed bandwidth traffic queues, based on traffic type specific algorithms that determine an eligibility for a queue associated with each type of traffic. When eligibility of queues for each type of traffic is determined, then another scheduling algorithm allocates service to each eligible queue of the traffic types based on, e.g., a rate proportional server algorithm.

In accordance with an exemplary embodiment of the present invention, scheduling selects one of a plurality of queues for service, at least one of the plurality of queues associated with a first traffic class. Selection for service includes (a) identifying each first traffic class (FTC) queue having at least one enqueued cell as an occupied FTC queue wherein at least one FTC queue is provisioned for burst scheduling of multiple cells when serviced; (b) identifying an occupied FTC queue provisioned for burst scheduling as a super-occupied FTC queue when the number of cells enqueued is greater than a specified number; and (c) setting as eligible for service each occupied FTC queue based on a FTC scheduling algorithm. An eligible FTC queue is selected for service based on a corresponding sub-priority of each eligible FTC queue, wherein each FTC queue is assigned a sub-priority based on a service level of a connection associated with enqueued cells; and when the super-occupied queue is serviced, the number of cells dequeued is based on a burst size.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

The present invention relates to a scheduler that may be used in switching of cells through a node while maintaining provisioned service levels or quality-of-service (QoS) guarantees. A scheduler operating in accordance with one or more embodiments of the present invention may have relatively high user data throughput while maintaining provisioned QoS guarantees for packet (cell) switches operating up to 10, or even 100, Tbps. For the exemplary embodiments described herein, the QoS guarantee for a connection is guaranteed bandwidth (GBW), although one skilled in the art would realize that present invention may be extended to other service level guarantees, such as maximum delay, lost packets, or similar service levels. As is known in the art, these other service levels may be translated into "effective" bandwidth. The scheduler may thus separate traffic into two types: standard traffic in which relatively "loose" system bounds are maintained for service, and GBW traffic in which provisioned QoS bandwidth levels are maintained.

Figure 1:
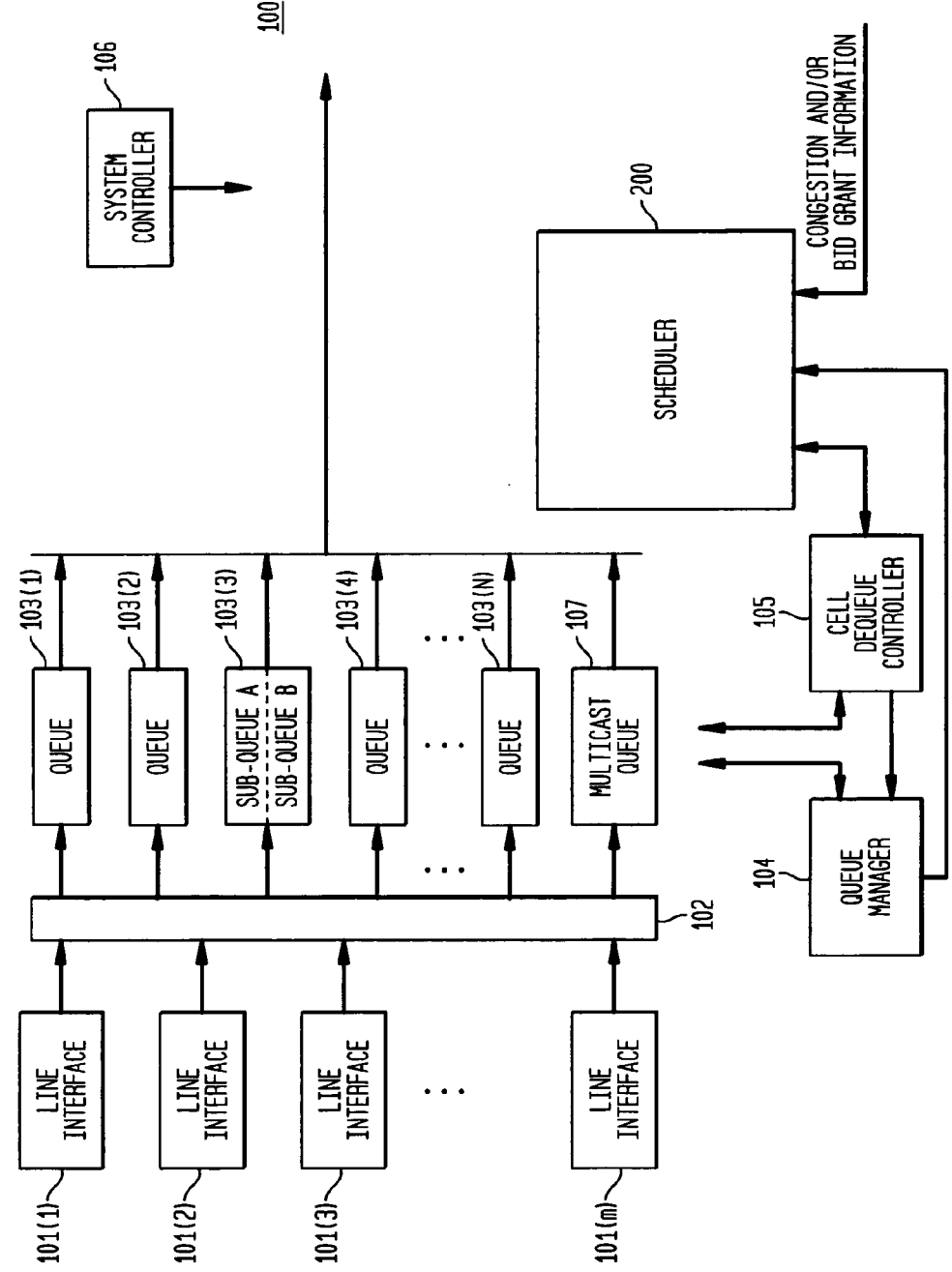
FIG. 1 shows a portion of a switch that includes a scheduler operating in accordance with an exemplary embodiment of the present invention.

FIG. 1 shows a portion of a switch 100 that includes scheduler 200 operating in accordance with an exemplary embodiment of the present invention. Switch 100 further comprises line interfaces 101(1)–101(M), queue interface 102, routing queues 103(1)–103(N), multicast queue 107, queue manager 104, and dequeue controller 105. Operations of the various elements of switch 100 may be coordinated via system controller 106. Line interfaces 101(1)–101(M) provide termination for network links, and each line interface typically includes both transmit and receive pairs of a link. Logically, the line interfaces are associated with input (receive) and output (transmit) port numbers. For the preferred embodiments described herein, line interfaces 101(1)–(101(M) terminate and switch traffic in accordance with line formats (and, hence, rates) between OC-12 and OC-768.

Line interfaces 101(1)–101(M) may typically operate with optical line formats conforming to a multiplexing hierarchy. Many standards exist that define such multiplexing hierarchies. For example, the Synchronous Digital Hierarchy (SDH) and the Synchronous Optical Network (SONET) models are employed for optical transmission systems. In SONET, the basic frame is a synchronous transport signal at level 1 (STS-1) that comprises 810 octets of data (27 octets overhead and 783 octets payload). Higher levels (STS-n) are formed from predefined multiples of n times the basic STS-1 frame. In general, SONET frames map directly to optical carrier (OC) line signals used for physical transmission through a line (i.e., STS-1 maps directly to OC-1, STS-48 maps directly to OC-48, etc.) Similarly, in SDH, the basic frame is a synchronous transmission module at level 1 (STM-1) that comprises 2430 octets of data (81 octets overhead and 2349 octets payload). Higher levels (STM-n) are formed from predefined multiples of n times the basic STM-1 frame. Many standards are related. For example, the STM-1 frame may be formed from 3 STS-1 frames. Thus, a certain SDH level may be mapped to a corresponding STS level, such as STM-1 mapped directly to STS-3, and STM-16 mapped directly to STS-48. However, only predefined multiples are allowed by the standards.

Queue interface 102 operates to direct cells of, for example, VC-connections between line interfaces 101(1)–101(M) to locations in buffer memory (not shown). The memory locations are logically assigned (or "linked") to corresponding routing queues 103(1)–103(N) and/or multicast queue 107 based on the particular connection. Association of a connection's cells received at a given one of line interfaces 101(1)–101(M) with a routing queue may typically be accomplished during the provisioning processes, and may be via control by queue manager 104. Provisioning associates cells of a given input port to a given destination port of the switch, and also associates connections with routing queues. Queue interface 102 extracts the connection identification, the destination output port, and the priority from each cell header.

Routing queues 103(1)–103(N) and multicast queue 107 together form a logic buffer structure for managing buffer memory. For the preferred embodiments of the present invention, routing queues 103(1)–103(N) are employed for unicast cell routing (e.g., packet connections with a single input port routed to a single output port). Routing queues 103(1)–103(N) are link-list, first-in, first out (FIFO) queues, with "link-list" referring to the linking of memory addresses of cells in memory to positions in the queue. Each queue has three stored parameters maintained by queue manager 104: a pointer to the first cell in the queue, a pointer to the last cell in the queue, and a value indicating the number of cells in the queue (the "queue length"). Cells are added to the tail of the queue ("enqueued") and removed when serviced from the head of the queue ("dequeued"). One or more of routing queues 103(1)–103(N), such as routing queue 103(3), may be logically divided into two sub-queues, queue A and queue B. Queue A may be associated with traffic that has GBW provisioning, while Queue B may be associated with standard traffic. Scheduler 200 considers each of the sub-queues A and B as a separate queue, as described subsequently, with each routing queue or sub-queue assigned a unique RQN (routing queue number).

Multicast queue 107 is employed as a common staging queue for multicast cell routing (e.g., packet connections with a single input port and multiple output ports). Multicast queue 107 is a circular FIFO queue divided into sections based on traffic priority, and cells are enqueued at the tail of the queue section based on priority. Each connection (cell) entry in multicast queue 107 is linked to a list of branches (destination ports). Maintaining a multicast cell with a list of branches allows for queuing without copying the data of the cell until the copy cell is transferred to the corresponding destination port. Multicast queue 107 is managed via a set of pointers to the connection's branch list, the first and last cell, and a scheduling value that are maintained by queue manager 104.

Queue manager 104 maintains the various parameters, as well as coordinating the cell enqueue process, for each of routing queues 103(1)–103(N) and multicast queue 107. Queue manager 104 provides queue length information, as well as information regarding when cells are enqueued, to scheduler 200.

Dequeue controller 105 coordinates service of routing queues 103(1)–103(N) and multicast queue 107. After scheduler 200 determines that a queue is eligible for service, and system 100 determines that the queue may be serviced, dequeue controller 105 causes cells in memory corresponding to the queue to be transferred either to a switch fabric, such as a cross-bar switch fabric, or to an output port.

Scheduler 200 determines whether one or more of routing queues 103(1)–103(N) and multicast queue 107 are eligible for service, and if so, what order service may be allocated to eligible queues. When an eligible queue is selected for service, termed a scheduling decision, this selection may be a tentative decision rather than actual scheduling of the queue for service. Before the eligible queue is serviced, information regarding output port availability and/or congestion may be employed to suspend service (or cancel service by packet discard) of the eligible queue. Thus, a scheduling decision may be employed to request service.

Figure 2:
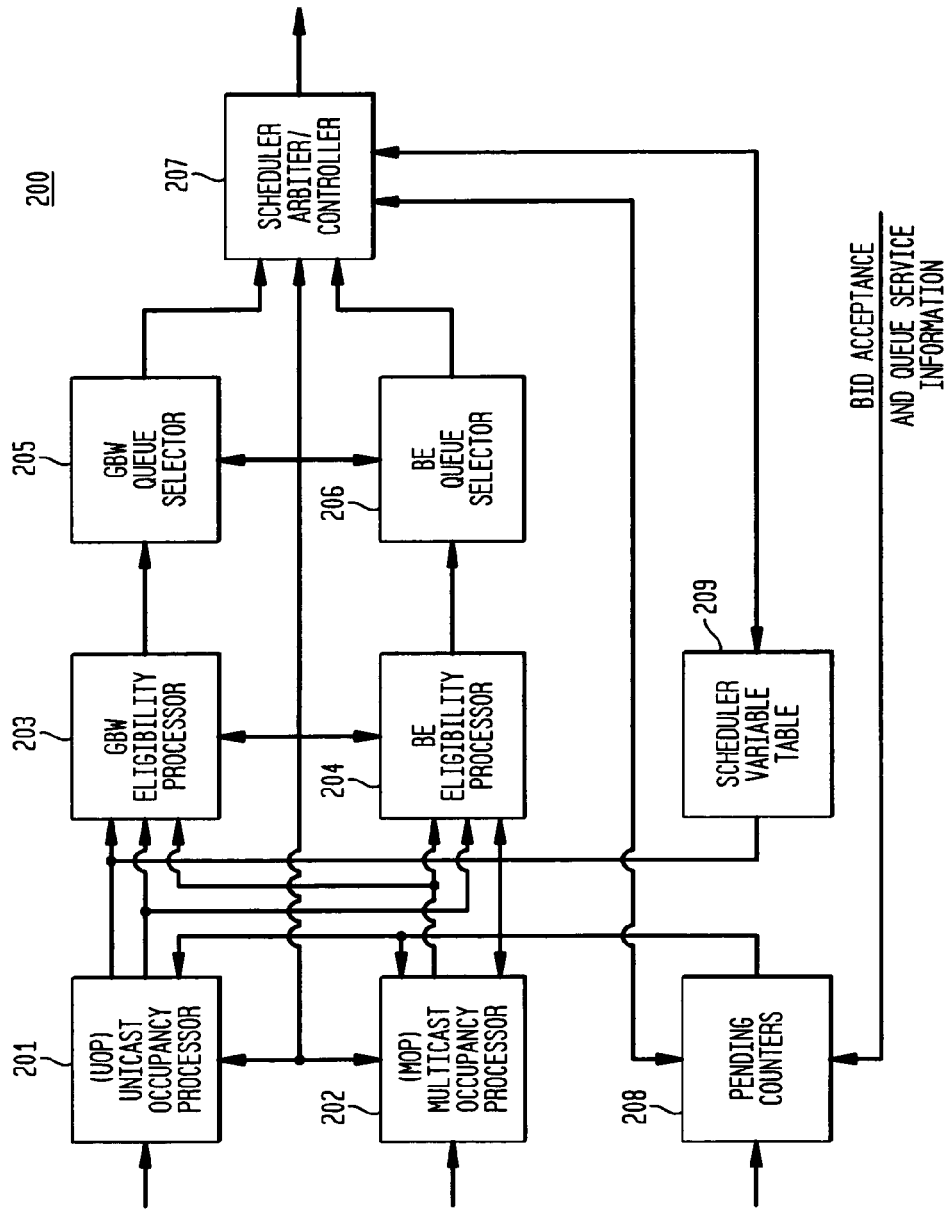
FIG. 2 shows an exemplary embodiment of the scheduler of FIG. 1.

FIG. 2 shows an exemplary embodiment of scheduler 200 of FIG. 1. Scheduler 200 comprises unicast occupancy processor (UOP) 201, multicast occupancy processor (MOP) 202, guaranteed bandwidth (GBW) eligibility processor 203, best effort (BE) eligibility processor 204, GBW queue selector 205, BE queue selector 206, and scheduler/ arbiter controller 207. Scheduler 200 further includes stored pending counters 208 and a scheduler variable table 209.

Scheduler 200 first determines the occupancy (number of cells) in routing queues 103(1)–103(N) and multicast queue 107 via UOP 201 and MOP 202, respectively. With occupancy information, eligibility of a queue for service is determined via GBW eligibility processor 203 and best effort (BE) eligibility processor 204. Given a set of queues eligible for service, the eligible queues are searched and selected for service via GBW queue selector 205 and BE queue selector 206 based on scheduling algorithms. As shown in the preferred exemplary embodiment of FIG. 2, occupancy, eligibility, and search/selection are performed for the queues associated with GBW traffic separately from occupancy, eligibility, and search/selection performed for queues associated with standard traffic. Scheduling of service for GBW traffic queues employs a shaped virtual clock method of queue selection, while scheduling of service for standard traffic queues employs a best effort (BE) method of queue selection. Given one or more eligible GBW traffic queues selected for service and one or more eligible BE (standard) traffic queues selected for service, scheduler/arbiter 207 determines a scheduling order for all eligible queues.

UOP 201 determines the occupancy of each one of routing queues 103(1)–103(N) (on a sub-queue by subqueue basis) assigned to unicast traffic. The queue length at a given point in time is not necessarily known to scheduler 200, but each queue length of routing queues 103(1)–103(N) may be provided by queue manager 104 (FIG. 1). If queue manager 104 does not provide queue lengths, queue manager 104 signals UOP 201 when a cell enqueue occurs in one or more of routing queues 103(1)–103(N). UOP 201 sets a value indicating occupancy of the corresponding queue. In either case, queue manager 104 provides UOP 201 the RQN along with the priority of the queue when a cell enqueue occurs. UOP 201 is also signaled, after a queue is scheduled and serviced (i.e., cells are dequeued from the queue), whether or not any additional cell(s) are still enqueued within the queue.

Queue length (or, more precisely, a cell counter value) is an "actual" queue length defined as the number of cells enqueued minus the number of cells dequeued after service of the queue. Pending counters 208 is a set of counters each of which counts the number of "pending" dequeues. The number of pending dequeues is defined as 1) the number of scheduled services for the queue not yet performed or 2) the number unanswered scheduling bids that are "pending". A scheduling bid is defined as a request for a scheduled service of an eligible queue that is subject to approval by an external bid arbiter. Scheduling bids are typically employed when the scheduler is implemented in a portion or stage of a multi-stage switch fabric. Each unicast queue (routing queues 103(1)–103(N) including sub-queues) for each class of traffic has an associated counter in pending counters 208. To account for currently scheduled but pending queue service, UOP 201 first subtracts the value in the pending counter from a given queue length prior to a decision on queue occupancy.

Pending counters 208 are employed for unicast queues; MOP 202 tracks of "queue length" of each multicast connection's cells in multicast queue 107 and takes into account pending scheduling decisions as it tracks the multicast queue length. A counter in pending counters 208 is incremented whenever a corresponding queue is scheduled. A counter in pending counters 208 is decremented in one of two ways. First, when a queue is serviced (one or more cells are dequeued from a queue), the corresponding pending counter is decremented. Second, when a request (bid) for service of queue based on a scheduling decision is denied, or when a low priority bid is denied for any reason, the corresponding pending counter is decremented. One skilled in the art would realize that the information stored and maintained through the use of pending counters may also be implemented with a processor counting and storing these values in memory.

Latency exists between the scheduling of a queue and the next determination by UOP 201 as to whether the queue should be considered occupied for another scheduling decision. This latency may cause poor scheduling performance for high speed input ports, such as an OC-192 or an OC-768 port because the queue may not receive the bandwidth it requires, and hence violate the provisioned GBW (QoS) guarantees. Therefore, embodiments of the present invention schedule transfer of multiple cells from a queue during one scheduling opportunity for queues that potentially require service more often to maintain provisioned bandwidth.

Figure 3:
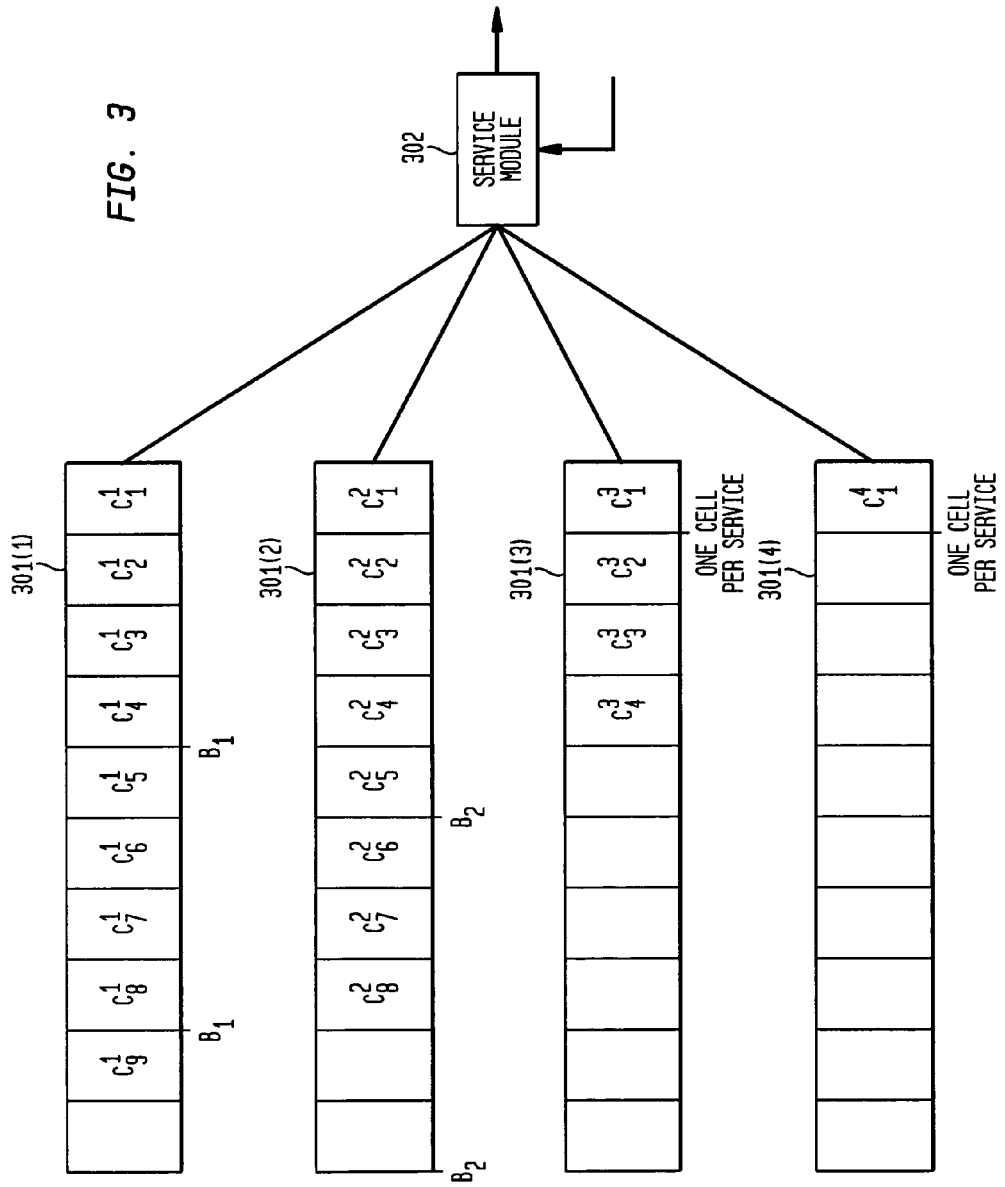
FIG. 3 illustrates the use of multiple cell service used with the scheduler of FIG. 2.

FIG. 3 illustrates the use of multiple cell service, termed scheduling "bursts." FIG. 3 shows four queues 301(1), 301(2), 301(3), and 301(4) that are scheduled for service by service module 302. Queue 301(1) has nine cells $C^1_{1-9}$ enqueued, queue 301(2) has eight cells $C^2_{1-8}$ enqueued, queue 301(3) has four cells $C^3_{1-4}$ enqueued, and queue 301(4) has one cell $C^4_1$ enqueued. Queues 301(1) and 301(2) each have a programmable burst size ($B_1$ and $B_2$), one per queue per class of traffic, that are stored in scheduler variable table 209 of FIG. 2. In FIG. 3, $B_1$ and $B_2$ are 4 cells and 5 cells, respectively. Thus, UOP 201 also maintains, on a per-queue basis, a super-occupancy value that complements the occupancy. A queue is considered to be super-occupied if its queue length is greater than or equal to the programmable burst size. For example, queue 301(1) is super-occupied since the number of enqueued cells is greater than the burst size. This determination of super-occupancy is made at the same time the occupancy determination is made, using queue lengths from queue manager 104. For preferred embodiments of the present invention, burst sizes are set as a power of 2 (e.g., 2, 4, 8, and 16).

However, service of a scheduling burst is not necessarily desirable if the queue has an insufficient number of cells to be dequeued. For example, queue 301(2) is super-occupied for a current service since there are greater than five cells enqueued. However, after the service, five cells are dequeued ($C^2_{1-5}$) and only three remain ($C^2_{6-8}$). A subsequent service may "waste" processing cycles if less cells are present in the queue than the burst size due to servicing of "empty" queue slots. Embodiments of the present invention thus may set several burst sizes up to a maximum programmable burst size for a queue. When occupancy is determined, the queue length is compared to the burst sizes and the largest burst size for the scheduled service is selected that contains no empty queue slots. If the number of enqueued cells is less than the smallest burst size, the smallest burst size is used.

An implementation of UOP 201 may be as follows. First, each queue (routing queues including sub-queues) has two associated occupancy flags: one for simple occupancy (i.e., at least one cell in the queue), and one for super-occupancy (i.e., the occupancy required for a burst to be scheduled). The states of these flags are determined (1) when an enqueue is performed to the queue, and (2) when the queue is scheduled. When an enqueue occurs, the queue number, traffic class, and queue length are provided to UOP 201 by queue manager 104. The value of the pending counter in pending counters 208 corresponding to the queue is subtracted from the queue length. If the occupancy flag is not already set high, or if the difference is non-zero, the occupancy flag is set high. If the super-occupancy flag is not already set high, or if the difference is greater than or equal to the burst size, then the occupancy flag is set high.

When a queue is scheduled for service, then both the occupancy flag and the super-occupancy flag are reset low. UOP 201 requests the queue length for the queue, and the value in the pending counter is subtracted from the received queue length. If the difference is non-zero, the occupancy flag is set. If the difference is greater than the burst value, the super-occupancy flag is set.

MOP 202 determines occupancy of multicast queue 107 in a similar manner to that described above for UOP 201. However, since a queue length is not necessarily stored for each connection by queue manager 104, queue lengths may be stored in scheduler 200 for each multicast branch, for each traffic class. Whenever a multicast linking operation is performed by queue manager 104, queue manager 104 sends the output port number (port bitmap) along with the traffic class to scheduler 200. The scheduler then increments counts for each of the branches. If scheduler 200 stores queue lengths for each multicast branch, pending counters are not necessary for support of multicast queue 107. The queue length counters are decremented when a multicast branch is scheduled.

However, a multicast cell may be removed from the multicast queue and, thus, the multicast branch table (list of destination ports), when queue manager 104 "ages out" a multicast cell that has been in the queue for an extended period of time. Queue manager 104 provides a flow of multicast branch bitmaps that have been cleared so that the corresponding queue lengths may be decremented. Also, an enqueued cell of a multicast branch may be scheduled for service before the multicast branch bitmap is cleared, and a bid for the same multicast branch may be pending concurrently for the cleared buffer. For this situation, the queue length for the multicast branch may be decremented twice: once for the scheduling decision and once for the clearing of the branch bitmap. To account for "double-counting", if the bid is accepted and a dequeue is attempted for the queue but cannot be honored, queue manager 107 provides information to scheduler 200 for denied dequeues. Using this information, the queue length counter is incremented if the dequeue is denied.

The following events result in changes to the multicast queue length counters. When a multicast cell is added to the multicast queue, the queue length counter is incremented if the corresponding branch bit is set high. When a multicast cell is removed from the multicast queue, the queue length counter is decremented if the corresponding branch bit is set high. When a multicast branch is scheduled, the queue length counter for the multicast branch is decremented. When a multicast branch dequeue is denied, the queue length counter for the multicast branch is incremented to offset double-counting. MOP 202 employs occupancy and super-occupancy flags operating in the same manner as described above for UOP 201.

GBW eligibility processor 203 determines whether a queue for unicast traffic, for example, GBW or class 1 priority traffic, marked as occupied by UOP 201 is eligible for service. In accordance with the present invention, high priority (e.g., GBW) traffic is scheduled using a shaped virtual clock (SHVCK) algorithm based on the eligibility determination by GBW eligibility processor 203. Simple occupancy is used. The SHVCK algorithm is implemented using free-running down counters. The down counter has its initial value set as a corresponding configuration variable termed "service period". Each queue has one down counter and service period register associated with it. When a queue is occupied and its counter has expired (decremented to zero), the queue is eligible for scheduling, and the queue's eligibility flag is set high indicating that the queue is eligible for service. The down counter does not wait to begin counting except for periods between scheduling intervals. When a queue is unoccupied, the down counter still counts freely down to zero. Thus, when the queue then becomes occupied when the next cell is enqueued, the queue becomes eligible immediately.

Figure 4:
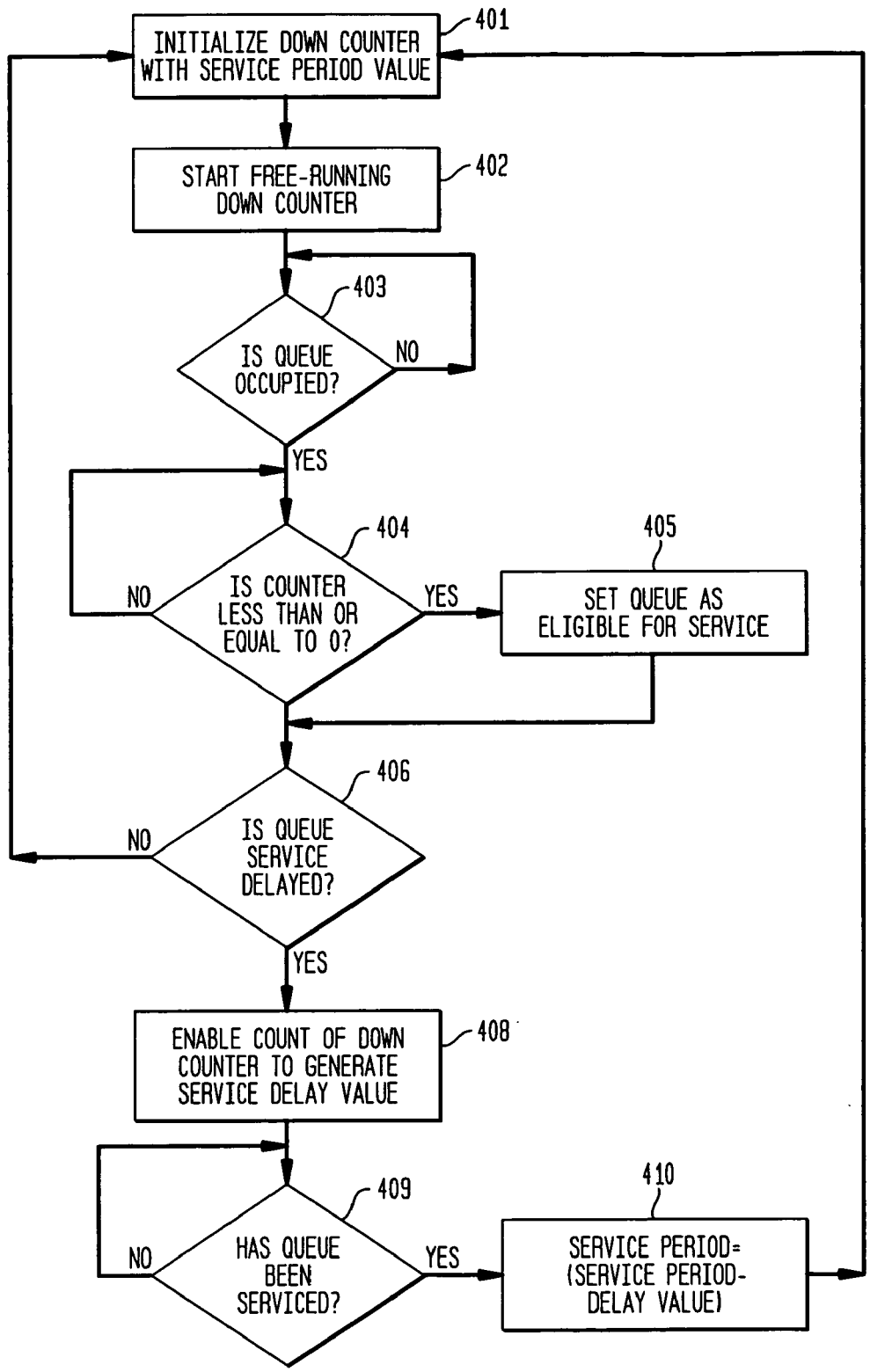
FIG. 4 illustrates the method employed using down counters for the shaped virtual clock algorithm.

Service period registers are stored in scheduler variable table 209. The down counters may be implemented with flags since they are free-running counters. FIG. 4 illustrates the method employed using down counters for the SHVCK algorithm. At step 401, the down counter is initialized with the service period value. For the first service interval, the service period value is a predetermined value. Afterwards, down counters are loaded with the service period value after a queue is scheduled for service. This service period value is available from scheduler variable table 209. At step 402, the free-running down counter is started. At step 403 a test checks whether the queue is occupied (i.e., has at least one cell). If the test of step 403 determines that the queue is not occupied, the method waits until the queue becomes occupied. When the test of step 403 determines that the queue is occupied, a test of step 404 checks the value in the counter.

If the test of step 404 determines that the value in the down counter has not reached zero, the method waits until the queue is occupied. If the test of step 404 determines that the value in the down counter is less than or equal to zero and the eligibility flag is not set, the queue is set as eligible for service in step 405. The eligibility flag is employed by GBW queue selector 205 (FIG. 2) to identify queues eligible for service. From step 405, or if the eligibility flag has been set, at step 406 the method determines whether service of the queue is delayed. If service of the queue is not delayed, the queue is/was serviced by an external process (by, e.g., operation of cell dequeue controller 105 of FIG. 1) and the method returns to step 401. When the method returns to step 401 from step 406, the service period value employed to initialize the down counter at step 401 may be the predetermined service period value stored in memory.

When a queue becomes eligible (queue is occupied and down counter has expired), but the service of the queue is determined to be delayed at step 406 due to, for example, an eligibility collision with another queue, at step 408 the down counter continues counting. At step 408, the down counter continues counting clock cycles between eligibility time (count=0) and service time. This value in the down counter is termed the service delay value. When the test of step 409 determines that queue received service, at step 410 the service delay value inside the down counter is subtracted from the service period value to generate a new service period. The method then returns to step 401. Adjusting the service period value to reflect the service delay prior to the loading of the service period into the down counter after the queue is scheduled gives the queue an appropriate "head start" in its next service interval. Thus, accounting for service delay contributes to maintaining the programmed ration of bandwidth (GBW) for the queue. If the service delay value is actually greater than the service period value, the queue becomes immediately eligible, if occupied. Thus, the service delay value is decremented by the service period value, and loaded into the down counter. The value within the down counter then continues to act as a service delay value until such time as the service period value exceeds the service delay value after the queue is scheduled.

Returning to FIG. 2, once a GBW queue is determined to be eligible, the eligibility information is then provided to GBW queue selector 205, which provides arbitration among eligible GBW queues for the next scheduling decision.

The eligibility value from GBW Eligibility Processor 203 for each of the GBW queues (unicast routing queues and multicast queue, including sub-queues) is provided to GBW queue selector 205. GBW queue selector 205 implements a rotation priority scheduling (RPS) algorithm that employs a pointer that points to the eligible GBW queue having the highest priority. The priority of the GBW queues is updated during each clock cycle. When scheduler arbiter/controller 207 (described subsequently) requests a queue selection, GBW queue selector 205 inspects the GBW queue eligibility values. If more than one GBW queue is determined to be eligible during a given clock cycle, the RPS algorithm of GBW queue selector 205 selects the GBW queue that is closest to the pointer. A GBW queue that is eligible but was not selected keeps its eligibility for the next clock cycle, which is the next RPS interval. The priority used as the starting point by the RPS algorithm is selected randomly (e.g., using a random value generated by a linear feedback shift register (LFSR)) each clock cycle.

For the preferred embodiment described herein employing 1088 queues (1024 unicast and 64 multicast queues), the RPS algorithm is implemented in stages since a 1088-state priority encoder with variable priority may not necessarily be implemented in one clock cycle. In a single clock cycle, if the priority is variable, 128 states may be reliably encoded. Thus, the RPS algorithm is implemented as a pipelined, twin-level priority encoder. The first level is a set of thirty two 34-bit priority encoders that represent groupings of 34 queues (32 unicast queues and two multicast branches) to arbitrate among the eligible queues in this group. The second level is a 32-bit priority encoder that arbitrates between the eligibilities determined in each of the 34-queue groups. Both levels have a pseudo-random priority pointer that is controlled by an LFSR and changes every clock cycle. The 34-queue first-level groups share the same pointer, and a separate pointer is employed for the second level to maximize fairness. The selected queue number is sent to the cell dequeue controller 105 of FIG. 1, that generates a scheduling bid for the selected queue.

Since connections with guaranteed levels of service may have different levels of guaranteed minimum bandwidth, GBW queue selector 205 also employs sub-priorities for the GBW queues. Two sub-priorities may be defined and assigned to GBW queues: high-priority and super-high-priority. Super-high-priority queues receive strict priority over high-priority queues. The GBW sub-priority is configured during provisioning. Generally, queues for higher bandwidth connections may be assigned super-high-priority to reduce jitter in scheduling decisions for these queues. Sub-priority is used to break "ties" for clock cycles during which an eligibility collision among queues occurs. A super-high-priority queue is thus selected over a high-priority-queue when a collision occurs.

GBW queue selector 205 also determines whether the GBW queue is provisioned for burst scheduling. GBW queue selector 205 uses the super-occupancy value generated by UOP 201 for this decision, with the length of the burst provided from scheduler variable table 209.

BE eligibility processor 204 determines whether queues assigned to standard traffic (lower priority, such as BE, traffic) are eligible for service. Queues for standard traffic are scheduled using a weighted round-robin (WRR) algorithm. Simple occupancy is used by the WRR algorithm.

Figure 5A:
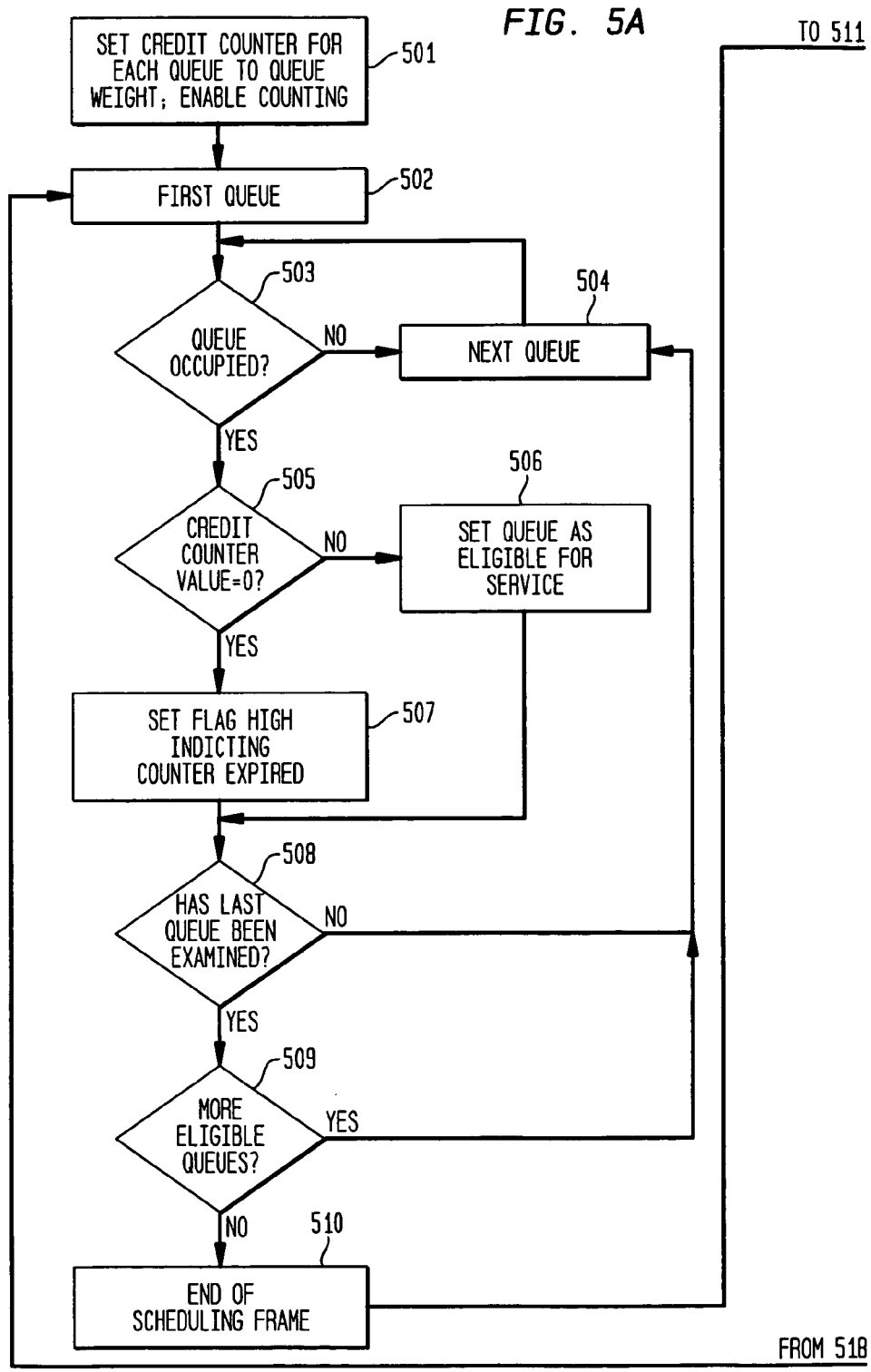
FIG. 5 illustrates the method employed using weights and counters for the best effort algorithm.
Figure 5B:
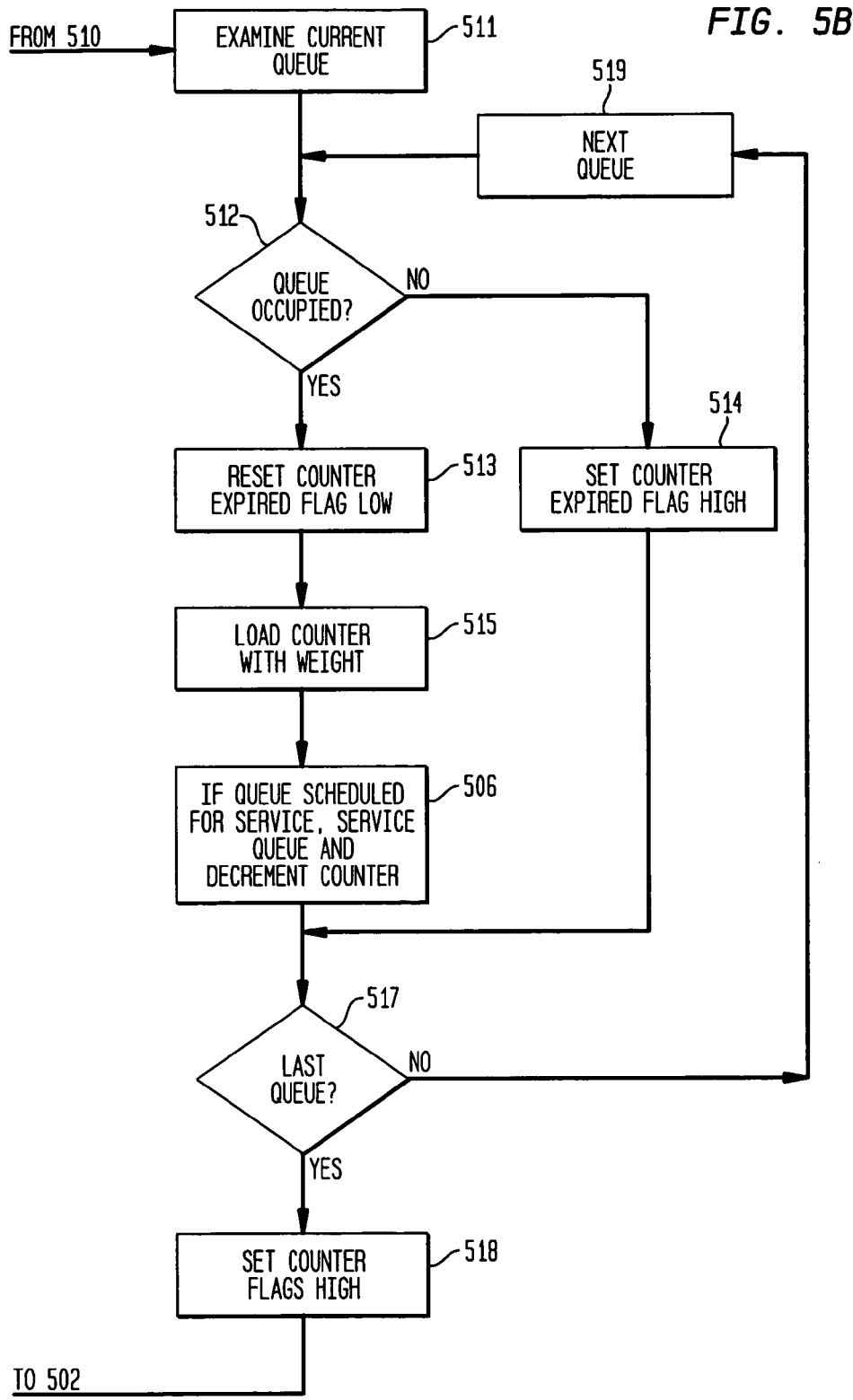

The WRR algorithm is implemented using weights and credit counters. The weight for a queue is a programmed value stored in scheduler variable table 209, and the credit counter count, which is a working value, is also stored in scheduler variable table 209. WRR divides the scheduling process into scheduling frames. FIG. 5 illustrates the method employed using weights and counters for the best effort algorithm. At step 501, at the beginning of the first scheduling frame, the value in the credit counter for each queue is initially set to the weight of the queue. Each time a queue is scheduled for service, the corresponding credit counter is decremented. At step 502, the first queue is selected and at step 503 a test determines if the current queue is occupied. If the test of step 503 indicates the queue is not occupied, the method advances to step 504 for the next, and returns to step 503 to test queue occupancy. If the test of step 503 determines that the current queue is occupied, then the test of step 505 determines if the credit counter has reached 0. If the test of step 505 determines that the credit counter has been decremented to 0, BE eligibility processor 204 includes a flag that is set (an expiration flag) at step 507 to indicate that a queue's credit counter has expired. If the test of step 505 determines that the count of the credit counter is non-zero (e.g., the expiration flag flag is set to zero and the queue is occupied), at step 506 the queue is set as eligible for service. Step 508 tests whether the last queue in the sequence has been examined, and if not, the method returns to step 504. If the last queue has been examined, then the method advances to step 509 to determine if more eligible queues remain. If there are more eligible queues, the method returns to step 504 to begin processing the sequence again. When the test of step 509 determines no more queues are eligible, the scheduling frame ends at step 510, and a new scheduling frame is begins at step 511.

At the beginning of a new scheduling frame (after the first scheduling frame), all queue occupancies are inspected by BE eligibility processor 204 to determine if the queue receives service during the next frame. At step 511, the first queue is examined and at step 512 examined to see if the queue is occupied. If the test of step 512 determines that the queue is unoccupied, the expiration flag is set high at step 514 to bar service of the queue. If the test of step 512 determines that the queue is occupied, the queue's credit counter expiration flag is reset low.

At step 515, depending on a "counter reset" flag, the value in the credit counter for a queue is reset to the weight of the queue. When a new scheduling frame starts at step 502, these "counter reset" flags were set high. If a queue is selected for service at step 516, its corresponding credit counter is decremented. However, the value in the credit counter is not necessarily the "weight" value from initialization, but rather whatever value stored in the counter at the end of the last frame. The value of the counter reset flag is used by BE eligibility processor 204 to determine whether the count value should be 1) decremented or 2) reinitialized to the weight value and then decremented. Setting the counter reset flags at the beginning of the frame effectively preloads all the counters with their corresponding weight value. The counter reset flag is reset low when the corresponding queue is scheduled.

Steps 516 and 514 advance to step 517. At step 517 a test determines whether the last queue has been examined and, if not, the method returns to step 519 for the next queue. When the test of step 517 determines all queues have been examined, the method returns to step 502.

BE queue selector 206 is configured and operates in the same manner as GBW queue selector 206, except that BE queue selector 206 does not necessarily employ sub-priorities for BE traffic queues.

Scheduler arbiter/controller 207 is primarily responsible for arbitrating among the scheduling decisions generated by GBW queue selector 205 and BE queue selector 206, and forwarding the scheduling decisions to cell dequeue controller 105 of FIG. 1. For the preferred embodiments described herein, arbitration selects a scheduling decision of GBW queue selector over a scheduling decision of BE queue selector 206. Scheduler arbiter/controller 207 is also responsible for maintenance of scheduling intervals (predefined periods of the system clock (also known as system potential) during which one or more queues are scheduled for service).

Figure 6:
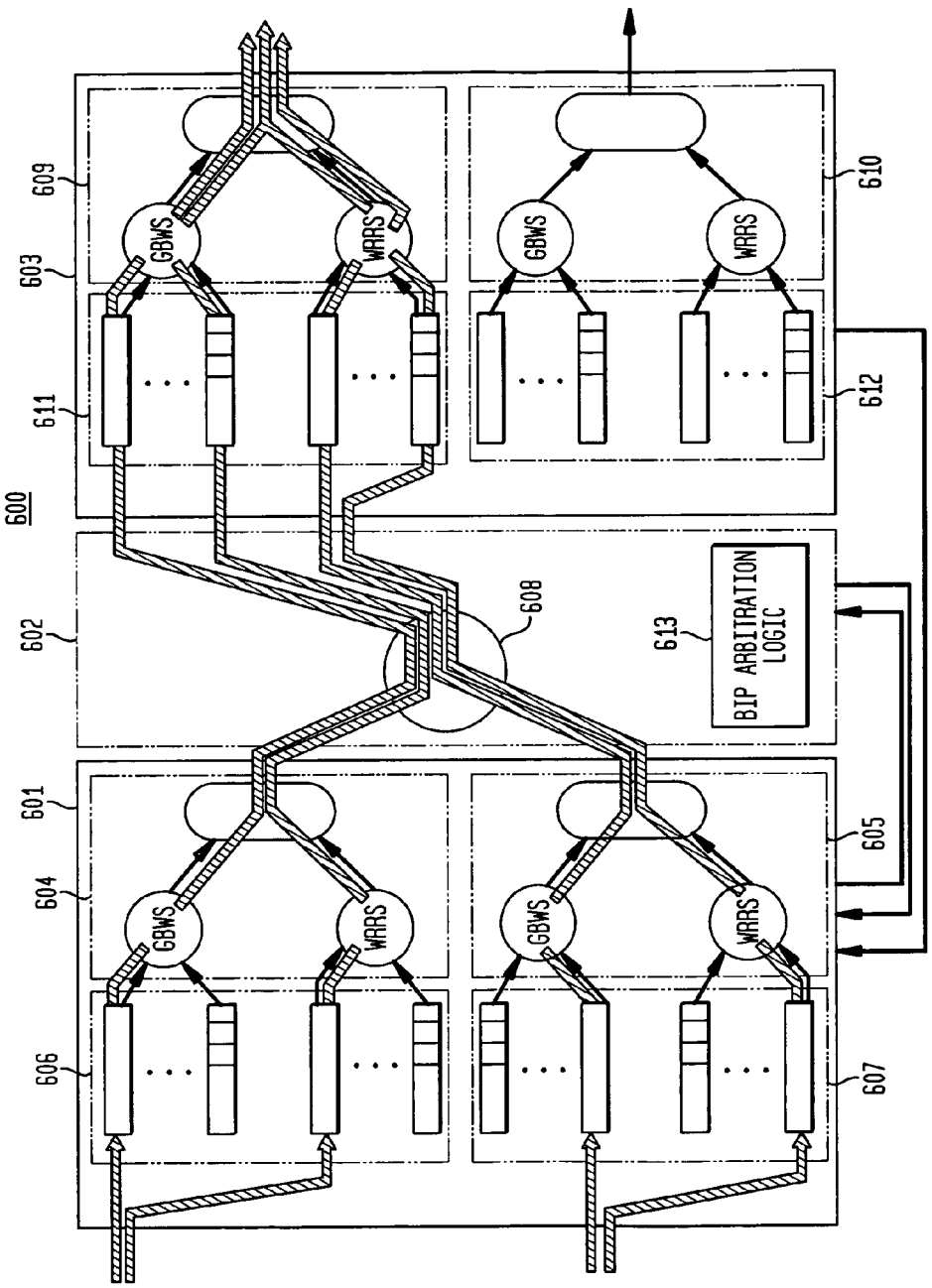
FIG. 6 shows a three-stage switch fabric including a first stage, second stage, and third stage employing a scheduler such as shown in FIG. 2.

Scheduler arbiter/controller 207 may also perform functions associated with the scheduler's specific use within a switch. For example, FIG. 6 shows three-stage switch fabric 600 including first stage 601, second stage 602, and third stage 603. Switch fabric 600 employs at least one scheduler operating in accordance with one embodiment of the present invention for the first stage (a first-stage configuration) and at least one scheduler operating in accordance with another embodiment for the third (a third-stage configuration). First stage 601 is coupled to a set of input ports (e.g., the receive sides of line interfaces 101(1)–101(M) in FIG. 1) that receive cells of connections. These cells are enqeued in queues 606 and 607 (such as the routing queues and multicast queue of FIG. 1). Schedulers 604 and 605 generate scheduling decisions for servicing queues 606 and 607, respectively, to transfer data to ingress links of cross-bar switching fabric 608. The second stage comprises cross-bar switching fabric 608 defined by sets of ingress and egress links, and can switch any ingress link to any egress link. Third stage 603 is coupled to the set of egress links of cross-bar switching fabric 608 that receive cells of connections. These cells are enqeued in queues 611 and 612 (such as the routing queues and multicast queue of FIG. 1. Schedulers 609 and 610 generate scheduling decisions for servicing queues 611 and 612, respectively, to transfer cells to output ports (e.g., the transmit sides of line interfaces 101(1)–101(M) in FIG. 1).

Thus, in a first-stage configuration, one or more schedulers are employed to coordinate transfer of cells from input queues to ingress links of a switch, while in a third-stage configuration one or more schedulers are employed to coordinate transfer of cells from output queues to output ports of line interfaces. However, information about 1) traffic congestion at queues 611 and 612 of third stage 603 and 2) availability of ingress-egress link pairs in cross-bar switching fabric 608 may be used by schedulers 604 and 605 in first stage 601. When traffic congestion information is available, schedulers 604 and 605 use this information (termed back-pressure) to determine whether a scheduling decision for a queue should be generated at all during the present clock cycle. Using availability of ingress-egress link pairs, however, employs a bid-based method of granting service to scheduling decisions. For this bid-based method, when either scheduler 604 or 605 generates a scheduling decision, a bid is created for the decision and passed to second stage 602. Since several schedulers may operate in first stage 601, bid-arbitration logic 613 in second stage 602 considers bids generated by schedulers 604 and 605 in light of information regarding availability of each ingress-egress port pair for the connections through the switch corresponding to the scheduling decisions of the bids. When bid arbitration logic 613 determines that a bid should be granted, the grant is communicated to the corresponding scheduler in first stage 601. The scheduler then completes the service for the scheduling decision by dequeuing cells for the connection in the corresponding queue to the ingress-egress link pair of cross-bar switching fabric 608.

Returning to FIG. 2, in a first-stage configuration, scheduler 200 produces a number of scheduling decisions equal to the maximum number of output ports that are supported for a given system clock rate. For this first-stage configuration, when a scheduling decision is required, scheduler arbiter/controller 207 requests a scheduling decision from either GBW queue selector 205 or BE queue selector 206, with one scheduling decision per priority.

For a third-stage configuration (which is equivalent to a single-stage switch, termed a stand-alone configuration), one scheduling decision is produced on behalf of each of the egress links of the cross-bar switch, which are mapped to output ports. Output ports may be "logical" output ports corresponding to aggregated traffic, in contrast to output links, which may correspond to physical links of, for example, an interface card coupled to an optical link. Thus, scheduler arbiter/controller 207 specifically requests a scheduling decision from a particular per-port queue selector (either GBW queue selector 205 or BE queue selector 206). The output links should be served in a pre-determined order that keeps the number of cycles between scheduling decisions for an output port as large as possible, smoothing out the intervals between scheduling decisions for each output link. To achieve this, during a scheduling interval exactly one scheduling decision is produced on behalf of each and every enabled output link. The streams of data of output ports are constituted from bundles of data portions read from consecutively serviced output links. Thus, an appropriate output link service ordering should be created via an output link-to-output port mapping of an appropriate output link order. An output link order that creates the widest possible distance between consecutively serviced queues of output ports is the bus-reversed sequential order.

The bus-reversed sequential order is arrived at by taking each output link number in an incrementing sequence (e.g., {"00000", "00001", "00010", "00011", "00100"...}) and reversing the bit ordering of each element in the sequence. Thus, the sequence {"00000", "00001", "00010", "00011", "00100", ...} becomes {"00000", "10000", "01000", "11000", "00100", ...}. Using integer nota sequence {0, 1, 2, 3, 4, ...}. becomes {0, 16, 8, 24, 4, ...}. The sequence exhibits large separation among the elements of the latter sequence. When each of these output link elements is then mapped to its corresponding output port, the output port service sequence results in service intervals for a given port that are maximally spaced. This output link service sequence is known to cell dequeue controller 105 (FIG. 1). Scheduling decisions are passed to cell dequeue controller 105, as in the first-stage configuration, and cell dequeue controller 105 buffers the decisions, passing the decisions to queue manager 104 in conventional incrementing order.

Table 1 shows which output link is serviced during each clock cycle of the current scheduling interval for stand-alone and third-stage configurations.

TABLE 1

| Cycle Number | Cycle Number (Binary) | Cycle Number (Bus-Reversed) | Output Link Number |
|---|---|---|---|
| 0 | "00000" | "00000" | 0 |
| 1 | "00001" | "10000" | 16 |

TABLE 1-continued

| Cycle Number | Cycle Number (Binary) | Cycle Number (Bus-Reversed) | Output Link Number |
|---|---|---|---|
| 2 | "00010" | "01000" | 8 |
| 3 | "00011" | "11000" | 24 |
| 4 | "00100" | "00100" | 4 |
| 5 | "00101" | "10100" | 20 |
| 6 | "00110" | "01100" | 12 |
| 7 | "00111" | "11100" | 28 |
| 8 | "01000" | "00010" | 2 |
| 9 | "01001" | "10010" | 18 |
| 10 | "01010" | "01010" | 10 |
| 11 | "01011" | "11010" | 26 |
| 12 | "01100" | "01100" | 6 |
| 13 | "01101" | "10110" | 22 |
| 14 | "01110" | "01110" | 14 |
| 15 | "01111" | "11110" | 30 |
| 16 | "10000" | "00001" | 1 |
| 17 | "10001" | "10001" | 17 |
| 18 | "10010" | "01001" | 9 |
| 19 | "10011" | "10011" | 25 |
| 20 | "10100" | "00101" | 5 |
| 21 | "10101" | "10101" | 21 |
| 22 | "10110" | "01101" | 13 |
| 23 | "10111" | "11101" | 29 |
| 24 | "11000" | "00011" | 3 |
| 25 | "11001" | "10011" | 19 |
| 26 | "11010" | "01011" | 11 |
| 27 | "11011" | "11011" | 27 |
| 28 | "11100" | "00111" | 7 |
| 29 | "11101" | "10111" | 23 |
| 30 | "11110" | "01111" | 16 |
| 31 | "11111" | "11111" | 31 |

Scheduler arbiter/controller 207 coordinates communication with other elements of scheduler 200 about scheduling decisions so that they may perform any updates of variables, flags, or counters. Scheduler arbiter/controller 207 inserts idle scheduling decisions into the scheduling decision stream sent to the cell dequeue controller 105. When neither GBW queue selector 205 nor BE queue selector 206 has a queue to schedule, it sends an "idle" decision. When scheduler 200 is employed in a third-stage or stand-alone configuration, in response to egress back-pressure, defective output links or disabled links, scheduler arbiter/controller 207 inserts "link idle" scheduling decisions, which cause the transfer of a "link idle" cell, which has no valid information and is discarded immediately by the receiving equipment.

Scheduler variable table 209 includes all per-queue configuration parameters used by the various elements of scheduler 200, and also includes credit counters used for scheduling of BE traffic queues for service. Scheduler variable table 209 is configured, for example, by system controller 106 of FIG. 1 and is accessed/updated after every scheduling decision. Scheduler variable table 209 may be implemented in memory and accessed twice per system clock cycle (e.g., in read and write access pair operations). For the described embodiment, there is one entry per queue and multicast branch, for a total of 1088 entries. Each entry in scheduler variable table 209 stores the following variables.

The variables gbws_burst and wrr_burst are used by UOP 201 and MOP 201, respectively, after a scheduling decision, to determine whether the scheduled queue is "super-occupied," and hence eligible for burst scheduling.

The variable gbws_period is used by the GBW traffic SHVCK algorithm (implemented with GBW eligibility processor 203 and GBW queue selector 205) to determine the service period of a queue. The variable gbws_period is loaded directly into the SHVCK algorithm down counter when the corresponding queue is configured by, for example, system controller 106. After the queue is scheduled, the variable service_period (which is the provisioned service period of the queue) is added to the value in the corresponding down counter that is the negative service delay value. If the service delay value exceeds the variable service_period, the queue is immediately determined to be eligible.

The variable gbws_prior is used by the SHVCK algorithm to determine whether the queue is a high-bandwidth queue. At the discretion of the user, certain high-bandwidth queues may be configured to have priority over lower bandwidth queues when there are "collisions" or ties in down counter expiration.

The variable wrr_weights is employed by the WRR algorithm (implemented with BE eligibility processor 204 and BE queue selector 206) to determine the number of times during a WRR scheduling "frame" that the queue should receive service. The variable wrr_weights is read at the beginning of a scheduling frame, and its value, after being decremented is loaded then into the variable wrr_credit.

The variable wrr_credit is a working value that is used by the WRR algorithm to determine how many scheduling opportunities remain to a queue during a given scheduling interval. It is decremented each time the queue is scheduled in a given frame until it reaches zero. At that point, the queue is ineligible until the next scheduling frame. The value of variable wrr_credit is written with the wrr_weight value when the queue is configured, and then set to the value of wrr_weight minus wrr_burst (if the queue is super-occupied) or with the value of wrr_weight minus one (if the queue is not super-occupied) at the beginning of a scheduling frame.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the scope of the invention as expressed in the following claims.

What is claimed is:

1. A method of selecting one of a plurality of queues for service, at least one of the plurality of queues associated with a first traffic class, the method comprising the steps of:
    (a) identifying each first traffic class (FTC) queue having at least one enqueued cell as an occupied FTC queue wherein at least one FTC queue is provisioned for burst scheduling of multiple cells when serviced;

(b) identifying an occupied FTC queue provisioned for burst scheduling as a super-occupied FTC queue when the number of cells enqueued is greater than a specified number;

(c) setting as eligible for service each occupied FTC queue based on a FTC scheduling algorithm, wherein, for step (c), the FTC scheduling algorithm is a shaped virtual clock algorithm; and (d) selecting for service an eligible FTC queue based on a corresponding sub-priority of each eligible FTC queue, wherein:

each FTC queue is assigned a sub-priority based on a service level of a connection associated with enqueued cells;

when the super-occupied queue is serviced, the number of cells dequeued is based on a burst size; and for step (c), each FTC queue has a corresponding down counter and service period value, wherein step (c) further comprises the steps of, during a scheduling interval, counting down from the service period value to a predefined value, and setting the corresponding FTC queue as eligible when the down counter reaches the predefined value.

2. The invention of claim 1, wherein, for step (a) the first traffic class comprises traffic having a provisioned guaranteed level of service.

3. The invention of claim 1, wherein step (a) comprises the steps of:

(a1) identifying whether a queue having cells associated with unicast traffic is occupied; and (a2) identifying whether a queue having cells associated with multicast traffic is occupied.

4. The invention of claim 1, wherein step (c) further comprises the step of continuing to count from the predefined value to generate a service delay value, and for a subsequent scheduling interval adjusting the service period value based on the service delay value.

5. The invention of claim 1, wherein step (c) further comprises the step of further setting an occupied FTC queue as eligible based on congestion information.

6. The invention of claim 1, wherein step (d) comprises the step of, for each sub-priority, addressing with a pointer the FTC queue having the highest priority value within those eligible FTC queues assigned to the sub-priority, the sub-priority of an eligible FTC queue based on the order in which the eligible FTC queue is set as eligible.

7. The invention of claim 6, further comprising the steps of: ranking each sub-priority, selecting the FTC queue within a sub-queue based on the pointer, and selecting for service the selected FTC queue from among the sub-queues based on the corresponding sub-queue's rank.

8. The invention of claim 6, further comprising the steps of generating a bid when the FTC queue selector selects a given FTC queue for service, and servicing the given FTC queue when the bid is granted.

9. The invention of claim 1, wherein at least one of the plurality of queues is associated with a second traffic class (STC), step (a) further comprises the step of identifying each STC queue having at least one enqueued cell as an occupied STC queue, and the method further comprises the steps of:

(e) setting as eligible for service each occupied STC queue based on a STC scheduling algorithm;

(f) selecting for service an eligible STC queue based on the corresponding priority of the eligible STC queue; and (g) selecting one of the FTC queue selected for service, if present, and the STC queue selected for service, if present.

10. The invention of claim 9, further comprising the steps of assigning each FTC queue priority over each STC queue, and selecting either the FTC queue or the STC queue based on the assigned priority.

11. The invention of claim 9, wherein, for step (e), the STC scheduling algorithm is a weighted round robin scheduling algorithm.

12. The invention of claim 9, wherein step (e) includes the step of accounting for delay in service of each eligible STC queue.

13. The invention of claim 9, for step (e), the second traffic class is best effort traffic.

14. The invention of claim 1, wherein the method is embodied as program steps in a processor of an integrated circuit.

15. The invention of claim 1, wherein more than one cell is dequeued from the super-occupied queue during a single selection of the super-occupied queue for service.

16. A scheduler for selecting one of a plurality of queues for service, at least one of the plurality of queues associated with a first traffic class (FTC), the scheduler comprising:

an occupancy processor configured to identify each FTC queue having at least one enqueued cell as an occupied FTC queue, wherein:
  1) at least one FTC queue may be provisioned for burst scheduling of multiple cells when serviced, and
  2) an occupied FTC queue provisioned for burst scheduling is also identified as a super-occupied FTC queue when a number of cells enqueued is greater than a provisioned number;

a FTC eligibility processor configured to set as eligible for service each occupied FTC queue based on a FTC scheduling algorithm, wherein the FTC scheduling algorithm is a shaped virtual clock algorithm; and a FTC queue selector configured to select for service an eligible FTC queue, wherein each FTC queue is assigned a sub-priority based on a service level of a connection associated with enqueued cells, the FTC queue selector selects an eligible FTC queue based on the corresponding sub-priority of each eligible FTC queue, and when the super-occupied FTC queue is serviced, the number of cells dequeued is based on a burst size; and wherein the FTC eligibility processor comprises a plurality of down counters, each FTC queue having a corresponding down counter and service period value, wherein during a scheduling interval each down counter counts from the service period value to a predefined value, and the corresponding FTC queue is set as eligible when the down counter reaches the predefined value.

17. The invention of claim 16, wherein the first traffic class comprises traffic having a provisioned guaranteed level of service.

18. The invention of claim 16, wherein the occupancy processor comprises:

a unicast occupancy processor configured to identify whether a queue having cells associated with unicast traffic is occupied; and a multicast occupancy processor configured to identify whether a queue having cells associated with multicast traffic is occupied.

19. The invention of claim 16, wherein, the down counter continues to count from the predefined value to generate a service delay value, wherein for a subsequent scheduling interval the service period value is adjusted based on the service delay value.

20. The invention of claim 16, wherein the FTC eligibility processor receives output port congestion information, and the FTC eligibility processor sets an occupied FTC queue as eligible based on the congestion information.

21. The invention of claim 16, wherein, for each sub-priority, the FTC queue selector comprises a pointer addressing the FTC queue having the highest priority value within those eligible FTC queues assigned to the sub-priority, the priority of an eligible FTC queue based on the order in which the eligible FTC queue is set as eligible by the FTC eligibility processor.

22. The invention of claim 21, wherein each sub-priority is ranked, and the FTC queue selector selects the FTC queue within a sub-queue based on the pointer, and selects for service the selected FTC queue from among the sub-queues based on the corresponding sub-queue's rank.

23. The invention of claim 21, wherein, when the FTC queue selector selects a given FTC queue for service, a bid is generated and the given FTC queue is serviced when the bid is granted.

24. The invention of claim 16, wherein at least one of the plurality of queues is associated with a second traffic class (STC), the occupancy processor is configured to identify each STC queue having at least one enqueued cell as an occupied STC queue, and the scheduler further comprises:
 a STC eligibility processor configured to set as eligible for service each occupied STC queue based on a STC scheduling algorithm;
 a STC queue selector configured to select for service an eligible STC queue based on the corresponding priority of the eligible STC queue; and
 a scheduler/arbiter controller configured to select one of the FTC queue selected for service, if present, and the STC queue selected for service, if present.

25. The invention of claim 24, wherein the STC scheduling algorithm is a weighted round robin scheduling algorithm.

26. The invention of claim 16, wherein the scheduler is embodied in a telecommunications switch.

27. The invention of claim 26, wherein the telecommunications switch is a three stage switch, the plurality of queues are associated with connections received at a plurality of input ports of the first stage, and the scheduler is embodied in the first stage to transfer cells to a plurality of input links of the second stage.

28. The invention of claim 26, wherein the telecommunications switch is a three stage switch, the plurality of queues are associated with cells received from output links of the second stage, and the scheduler is embodied in the third stage to transfer cells from the plurality of queues to a plurality of output ports.

29. The invention of claim 16, wherein the scheduler is embodied in an integrated circuit.

30. The invention of claim 16, wherein more than one cell is dequeued from the super-occupied queue during a single selection of the super-occupied queue for service.

31. A computer-readable medium having stored thereon a plurality of instructions, the plurality of instructions including instructions which, when executed by a processor, cause the processor to implement a method of selecting one of a plurality of queues for service, at least one of the plurality of queues associated with a first traffic class, the method comprising the steps of:

(a) identifying each first traffic class (FTC) queue having at least one enqueued cell as an occupied FTC queue wherein at least one FTC queue is provisioned for burst scheduling of multiple cells when serviced;
(b) identifying an occupied FTC queue provisioned for burst scheduling as a super-occupied FTC queue when the number of cells enqueued is greater than a specified number;
(c) setting as eligible for service each occupied FTC queue based on a FTC scheduling algorithm, wherein, for step (c), the FTC scheduling algorithm is a shaped virtual clock algorithm; and
(d) selecting for service an eligible FTC queue based on a corresponding sub-priority of each eligible FTC queue, wherein:
 each FTC queue is assigned a sub-priority based on a service level of a connection associated with enqueued cells;
 when the super-occupied queue is serviced, the number of cells dequeued is based on a burst size; and
 for step (c), each FTC queue has a corresponding down counter and service period value, wherein step (c) further comprises the steps of, during a scheduling interval, counting down from the service period value to a predefined value, and setting the corresponding FTC queue as eligible when the down counter reaches the predefined value.

32. A method of selecting one of a plurality of queues for service, at least one of the plurality of queues associated with a first traffic class, the method comprising the steps of:
(a) identifying each first traffic class (FTC) queue having at least one enqueued cell as an occupied FTC queue wherein at least one FTC queue is provisioned for burst scheduling of multiple cells when serviced;
(b) identifying an occupied FTC queue provisioned for burst scheduling as a super-occupied FTC queue when the number of cells enqueued is greater than a specified number;
(c) setting as eligible for service each occupied FTC queue based on a FTC scheduling algorithm; and
(d) selecting for service an eligible FTC queue based on a corresponding sub-priority of each eligible FTC queue, wherein:
 each FTC queue is assigned a sub-priority based on a service level of a connection associated with enqueued cells;
 when the super-occupied queue is serviced, the number of cells dequeued is based on a burst size; and
 step (d) comprises the step of, for each sub-priority, addressing with a pointer the FTC queue having the highest priority value within those eligible FTC queues assigned to the sub-priority, the sub-priority of an eligible FTC queue based on the order in which the eligible FTC queue is set as eligible.

33. The invention of claim 32, further comprising the steps of: ranking each sub-priority, selecting the FTC queue within a sub-queue based on the pointer, and selecting for service the selected FTC queue from among the sub-queues based on the corresponding sub-queue's rank.

34. The invention of claim 32, further comprising the steps of generating a bid when the FTC queue selector selects a given FTC queue for service, and servicing the given FTC queue when the bid is granted.

35. A scheduler for selecting one of a plurality of queues for service, at least one of the plurality of queues associated with a first traffic class (FTC), the scheduler comprising:

an occupancy processor configured to identify each FTC queue having at least one enqueued cell as an occupied FTC queue, wherein:
   1) at least one FTC queue may be provisioned for burst scheduling of multiple cells when serviced, and
   2) an occupied FTC queue provisioned for burst scheduling is also identified as a super-occupied FTC queue when a number of cells enqueued is greater than a provisioned number;

a FTC eligibility processor configured to set as eligible for service each occupied FTC queue based on a FTC scheduling algorithm; and a FTC queue selector configured to select for service an eligible FTC queue, wherein:
   each FTC queue is assigned a sub-priority based on a service level of a connection associated with enqueued cells;
   the FTC queue selector selects an eligible FTC queue based on the corresponding sub-priority of each eligible FTC queue;
   when the super-occupied FTC queue is serviced, the number of cells dequeued is based on a burst size; and
   for each sub-priority, the FTC queue selector comprises a pointer addressing the FTC queue having the highest priority value within those eligible FTC queues assigned to the sub-priority, the priority of an eligible FTC queue based on the order in which the eligible FTC queue is set as eligible by the FTC eligibility processor.

36. The invention of claim 35, wherein each sub-priority is ranked, and the FTC queue selector selects the FTC queue within a sub-queue based on the pointer, and selects for service the selected FTC queue from among the sub-queues based on the corresponding sub-queue's rank.

37. The invention of claim 35, wherein, when the FTC queue selector selects a given FTC queue for service, a bid is generated and the given FTC queue is serviced when the bid is granted.

38. A computer-readable medium having stored thereon a plurality of instructions, the plurality of instructions including instructions which, when executed by a processor, cause the processor to implement a method of selecting one of a plurality of queues for service, at least one of the plurality of queues associated with a first traffic class, the method comprising the steps of:
   (a) identifying each first traffic class (FTC) queue having at least one enqueued cell as an occupied FTC queue wherein at least one FTC queue is provisioned for burst scheduling of multiple cells when serviced;
   (b) identifying an occupied FTC queue provisioned for burst scheduling as a super-occupied FTC queue when the number of cells enqueued is greater than a specified number;
   (c) setting as eligible for service each occupied FTC queue based on a FTC scheduling algorithm; and
   (d) selecting for service an eligible FTC queue based on a corresponding sub-priority of each eligible FTC queue, wherein:
   each FTC queue is assigned a sub-priority based on a service level of a connection associated with enqueued cells;
   when the super-occupied queue is serviced, the number of cells dequeued is based on a burst size; and
   step (d) comprises the step of, for each sub-priority, addressing with a pointer the FTC queue having the highest priority value within those eligible FTC queues assigned to the sub-priority, the sub-priority of an eligible FTC queue based on the order in which the eligible FTC queue is set as eligible.

39. The invention of claim 38, further comprising the steps of: ranking each sub-priority, selecting the FTC queue within a sub-queue based on the pointer, and selecting for service the selected FTC queue from among the sub-queues based on the corresponding sub-queue's rank.

40. The invention of claim 38, further comprising the steps of generating a bid when the FTC queue selector selects a given FTC queue for service, and servicing the given FTC queue when the bid is granted.

* * * * *